United States Patent [19]

Mumford et al.

[11] Patent Number: 4,897,729

[45] Date of Patent: Jan. 30, 1990

[54] TELECINE WITH ELECTRONICALLY VARIABLE RASTER TO PRODUCE PICTURE EFFECTS

[75] Inventors: Ronald W. J. Mumford, Hitchin; Terence W. Mead, Hertford, both of England

[73] Assignee: Rank Cintel Limited, United Kingdom

[21] Appl. No.: 164,523

[22] Filed: Mar. 7, 1988

[51] Int. Cl.⁴ .............................................. H04N 3/36
[52] U.S. Cl. ................................. 358/216; 358/214
[58] Field of Search ................. 358/214, 215, 216, 54

[56] References Cited

U.S. PATENT DOCUMENTS

| | | | |
|---|---|---|---|
| 4,418,360 | 11/1983 | Glasgow | 358/214 |
| 4,485,406 | 11/1984 | Brownstein | 358/214 |
| 4,603,966 | 8/1986 | Brownstein | 358/54 |
| 4,660,091 | 4/1987 | Nutting | 358/214 |

*Primary Examiner*—Jin F. Ng
*Assistant Examiner*—Stephen Brinich
*Attorney, Agent, or Firm*—Ostrolenk, Faber, Gerb & Soffen

[57] ABSTRACT

In a flying spot telecine used to generate video signals by scanning a film, the scanning raster is adjustable angularly relative to the film being scanned. The output video signal hence represents the image on the film but angularly displaced relative to the orientation of the film itself. Using this method angular and rotational picture effects can be generated without the need for expensive computer memory or complex processing of picture information.

31 Claims, 1 Drawing Sheet

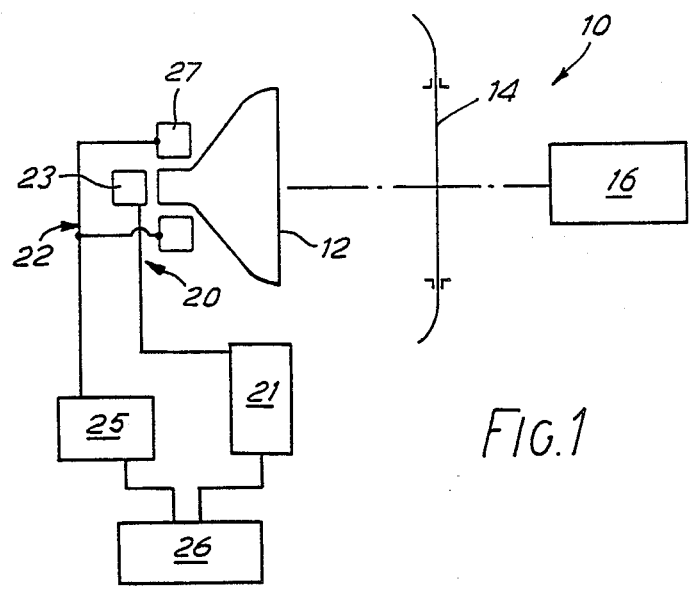
FIG.1
FIG.2
(a)  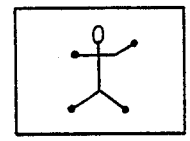
(b)  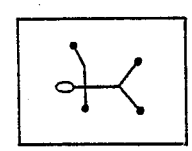
(c)  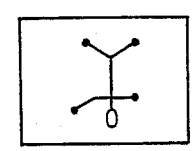
(d)  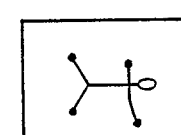

TELECINE WITH ELECTRONICALLY VARIABLE RASTER TO PRODUCE PICTURE EFFECTS

BACKGROUND OF THE INVENTION

The present invention relates to a method and apparatus for producing picture effects by means of telecine apparatus. In particular, it relates to the provision of angularly displaced or rotating effects.

Hitherto, where it has been desired to give the impression of a rotating picture on a television screen or to display an image at an angle to the true orientation of the image on the film scanned by the telecine, this has been achieved by writing a digitised picture information into computer memory pixel-by-pixel. The stored picture information, when complete, is read from the memory under computer control in a different order to that in which it was read in. The controlling computer chooses the sequence of memory addresses and, hence, the order in which the stored pixels are read and displayed. A great many picture effects, including angular and rotary effects can be achieved using such computer based digital techniques. However, these techniques are costly since the volume of memory required is great and complex interpolation is required to generate pixels for positions which are not exactly represented by the stored digital information.

It is an object of the invention to provide a method and apparatus by means of which rotating or angular picture effects may be produced without the need for costly computer memory or complex control programs.

SUMMARY OF THE INVENTION

In a first aspect, the invention provides a method of generating a video signal representing an image on a transparent film portion by scanning said film portion in a raster-scanning telecine. The raster of said telecine is adjustable to vary the angle of the raster relative to the film portion so that the video signal represents the image angularly displaced relative to the film portion. Preferably, the angle of the raster is continuously variable so that the video signal may represent the image undergoing rotational motion relative to the film portion.

Using the method of the invention, a video signal representing an angularly displaced or rotating picture is generated directly by the telecine and can be transmitted to remote receivers without the need for complex computer controlled processing as has hitherto been required.

In a second aspect, the invention provides a telecine for generating a video signal representing an image on a transparent film portion. The telecine comprising scanning means for scanning the image with a scanning raster and control means operable to vary the angle of the raster relative to the film portion so that the video signal represents the image angularly displaced relative to the film portion. Preferably, the control means is operable to vary the angle of the raster continuously so that the video signal represents the image undergoing rotational motion relative to the film portion. In a preferred embodiment the scanning means includes horizontal and vertical scan amplifiers and coils for generating the raster. Both the vertical and horizontal scan amplifiers and coils are capable of scanning at a rate sufficient to provide the horizontal scan for generating video signals for use in conventional television systems.

BRIEF DESCRIPTION OF THE DRAWINGS

FIG. 1 is a schematic diagram of a flying spot telecine in accordance with the invention; and FIGS. 2a-2d illustrate the effects achieved by rotating the scanning raster in the telecine of FIG. 1.

DETAILED DESCRIPTION OF A PREFERRED EMBODIMENT

A telecine apparatus 10 shown in FIG. 1 is a flying spot telecine comprising cathode ray tube (CRT) scanning means 12, a film gate 14 through which the film to be scanned passes continuously, and a photodetector 16 into which light from the CRT scanning means 12 transmitted by the film is focussed by an appropriate lens arrangement (not shown). The output signal from the photodetector 16 is processed by conventional means and, eventually, transmitted as a video signal to remote television receivers.

The scanning raster followed by the flying spot of the CRT scanning means 12 is generated by horizontal and vertical deflection means 20 and 22 respectively.

The horizontal deflection means 20 is not of the type conventionally used to provide a horizontal scan in flying spot telecine apparatus. That is to say, it comprises a linear amplifier 21 driving a low impedance deflection coil 23. This arrangement is capable of driving the CRT electron beam at speeds sufficiently high to permit scanning at the high frequencies employed in current television systems in the United States of America.

In conventional telecine apparatus, the vertical deflection means 22 would comprise a linear amplifier 25 driving a deflection coil 27. However, in conventional telecine apparatus, the vertical deflection coil 27 is generally of much higher impedance than the horizontal deflection coil 23, since the vertical deflection means need only drive the CRT flying spot at rates up to about 60Hz. However, in the telecine apparatus 10 of the invention, the vertical deflection coil 27 is of low impedance similar to that of the horizontal deflection coil 23. Similarly, the vertical deflection amplifier is identical to the horizontal deflection amplifier 21. The reason for this will become apparent from the description which follows.

We have recognized that rotating an angular picture effect on the television screen can be achieved by rotating or angularly displacing the scanning raster generated in the CRT scanning means 12 so that the picture information generated at the output of the photodetector 16 can be transmitted to remote television receivers without complex processing to re-order the picture information.

This is illustrated in FIG. 2 of the drawings.

In FIG. 2a, the scanning raster shown at the left hand side of the drawing is oriented in a conventional manner. That is to say, the scanning raster commences at the top left and continues horizontally until it reaches the end of the line. The flying spot then returns rapidly to the left hand end of the next successive line. The image which appears at a television set receiving the video signal generated by the telecine 10 displays the image in an upright position. In FIG. 2c, the scanning raster is inverted, that is, the raster commences at the bottom right and scans a single line from right to left before flying back to the next line which is positioned above rather than below the proceeding line. The image produced at the screen while the scanning raster occupies this orientation is inverted.

FIGS. 2b and 2d illustrate the intermediate positions between the upright orientation of FIG. 2a and the inverted orientation of FIG. 2c, that is, rotation through 90° and through 270°, respectively. It will be noted that in FIGS. 2b and 2d, successive lines of the scanning raster are offset to compensate for the movement of the film through the film gate 14 of the telecine 10. Similarly, the lengths of the lines of the scanning raster are adjusted in the 90° and 270° orientations to adjust for the film movement.

Although the scanning raster is shown in FIG. 2 oriented at 90° intervals, the rotation may be gradual, occurring over several seconds. This can be achieved by adding or subtracting progressively more of the horizontal drive waveform to the vertical deflection means 22 and similarly more of the vertical drive waveforms to the horizontal deflection means 20. The application of the drive waveforms to the horizontal and vertical deflection means 20 and 22 may be performed under the control of a programmable control means 26. The programmable control means 26 is preferably such that the angle of the scanning raster is variable on a frame-by—frame basis or seam by seam or any multiple of frames basis to provide the desired effect. For example by increasing the angle of the scanning raster by a predetermined amount each frame, the image can be made to appear to rotate. The speed of rotation can be varied by altering the angular change per between each frame and the next. Alternatively, an oscillating effect can be achieved by alternating the angular displacement of successive frames. By suitable programming, the control means 26 can be made to produce a wide range of differing effects at will.

The control means 26 will also control the line offset of any given scanning raster, and the line length so as to compensate both for film movement and to maintain the correct aspect ration for the image produced from the video signal output from the photodetector 16.

Rotation of the scanning raster can be achieved only in telecine equipment in which the vertical deflection means 22 and horizontal deflection means 20 are each capable of providing scanning rates appropriate to the line scan as well as the frame scan it provides in the conventional manner.

It will be appreciated by those skilled in the art that where a picture store is provided to enable a range of film speeds to be accomodated, the same store can be used to provide an output signal in which alternate lines are reversed simply by reversing the order in which data is read out of the store. With such an arrangement, the scanning speeds achievable by the deflection means can be reduced since there is no need to allow for flyback time.

The control can vary the aspect ration at will such that the rotating pictures can be reduced or increased in size. Similarly, the centre of rotation can be repositioned. A range of other effects can be achieved when using linear amplifiers by changing scan sizes and start and stop provisions. These include horizontal or vertical shifts, changes in amplitude in the horizontal and vertical directions, distortion of linearity, along elipses or curves generally, perspective effects and trapezoids.

What I claim is:

1. A method of generating a video signal representing an image on a transparent film portion by scanning said film portion in a raster-scanning telecine, wherein said raster of said telecine is adjusted electronically to vary the angle of the raster relative to the said film portion, whereby said video signal represents said image angularly displaced relative to the said film portion.

2. The method set forth in claim 1, wherein said angle of said raster is continuously variable, whereby said video signal represents said image undergoing rotational motion relative to said film portion.

3. The method set forth in claim 1, wherein successive lines of said raster are offset relative to one another to compensate for movement of said film portion through said telecine.

4. The method set forth in claim 1, wherein the lengths of said lines of said raster are adjusted to compensate for movement of said film portion through said telecine.

5. The method set forth in claim 1, wherein the lengths of the lines of said raster are adjusted to maintain the aspect ratio of said image constant.

6. A telecine for generating a video signal representing an image on a transparent film portion, comprising scanning means for scanning said image with a scanning raster and control means operable to electronically vary the angle of the raster relative to the said film portion, whereby said video signal represents said image angularly displaced relative to said film portion.

7. The telecine set forth in claim 6, wherein said control means is operable to vary said angle of said raster continuously, whereby said video signal represents said image undergoing rotational motion relative to said film portion.

8. The telecine set forth in claim 6, wherein said control means is operable to cause successive lines of said raster to be offset relative to one another to compensate for movement of said film portion through said telecine.

9. The telecine set forth in claim 6, wherein said control means is operable to vary the lengths of the lines of said raster to compensate for movement of said film portion through said telecine.

10. The telecine set forth in claim 6, wherein said control means is operable to vary the lengths of the lines of said raster to maintain the aspect ratio of said image constant.

11. The telecine set forth in claim 6, wherein said scanning means includes horizontal and vertical scan amplifiers and coils for generating said raster, both said vertical and said horizontal scan amplifiers and coils being capable of scanning at a rate sufficient to provide the horizontal scan for generating video signals for use in conventional television systems.

12. A method for generating a video signal representing an original image on a transparent film portion, said method comprising the steps of:
    passing said transparent film portion through a film gate of a telecine which includes a light source for scanning said film portion in a raster like manner and a light sensor for sensing the light generated by said light source and passing through said film portion, the orientation of said light source and said light sensor being stationary with respect to one another;
    electronically adjusting the angular orientation of said scanning raster of said light source relative to the film portion; and
    generating a video signal indicative of a reproduction of said original image as a function of said light received by said light sensor such that the orientation of said reproduction of said original image is angularly displaced relative to said original image.

13. The method set forth in claim 12, wherein said angular orientation of said raster is adjusted as said film portion moves through said telecine whereby said representation of said images in said video signal undergo rotational motion relative to said film portion.

14. The method set forth in claim 12, wherein successive lines of said raster are offset relative to one another to compensate for movement of said film portion through said telecine.

15. The method set forth in claim 12, wherein the lengths of said lines of said raster are adjusted to compensate for movement of said film portion through said telecine.

16. The method set forth in claim 12, wherein the lengths of the lines of said raster are adjusted to maintain the aspect ratio of said image constant.

17. Apparatus for generating a video signal representing an image on a transparent film portion, said apparatus comprising:
   a telecine, said telecine including means for passing said transparent film portion through a gate of said telecine, said telecine further including a light source for scanning said film portion in a raster like manner and a light sensor for sensing the light film generated by said light source and passing through said film portion, the orientation of said light source in said light sensor being stationary with respect to one another;
   means for electronically adjusting the angular orientation of said scanning raster of said telecine relative to said film path; and
   said telecine generating a video signal indicative of a reproduction of said original image as a function of said light received by said light sensor such that the orientation of said reproduction of said original image is angularly displaced relative to said original image.

18. The apparatus set forth in claim 17, wherein said adjusting means varies said angular orientation as said film portion moves through said film gate whereby said reproduced images undergo rotational motion relative to said film portion.

19. The apparatus set forth in claim 17, wherein said adjusting means causes successive lines of said raster to be offset relative to one another to compensate for movement of said film portion through said film gate.

20. The apparatus set forth in claim 17, wherein said adjusting means causes the lengths of said lines of said raster to be adjusted to compensate for movement of said film portion through said film gate.

21. The apparatus set forth in claim 17, wherein said adjusting means causes the lengths of said lines of said raster to be adjusted to maintain the aspect ratio of said reproduced image constant.

22. The apparatus set forth in claim 17, wherein said adjusting means includes horizontal and vertical scan amplifiers and coils for generating said raster, both said vertical and said horizontal scan amplifiers and coils being capable of scanning at a rate sufficient to provide the horizontal scan for generating video signals for use in conventional television systems.

23. A method of generating a video signal representing an image on a transparent film portion by scanning said film portion in a raster-scanning telecine, the angle of said raster of the telecine being continuously variable whereby said video signal represents said image angularly displaced relative to said film portions and represents said image undergoing rotational motion relative to said film portion.

24. A method of generating a video signal representative of an image on a transparent film portion by scanning said film portion in a raster-scanning telecine, said raster of said telecine being adjustable to vary the angle of said raster of said film portion whereby said video signal represents an image angularly displaced relative to said film portion and successive lines of said raster are offset relative to one another to compensate for movement in said film portion to said telecine.

25. A method of generating a video signal representing an image on a transparent film portion by scanning said film portion in a raster-scanning telecine, said raster of said telecine being adjustable to vary the angle of said raster relative to said film portion, the lengths of said lines of said raster being adjusted to compensate for movement in said film portion through said telecine whereby said video signal represents said image angularly displaced relative to said film portion.

26. A method of generating a video signal representing an image on a transparent film portion by scanning said film portion in a raster-scanning telecine, said raster of said telecine being adjustable to vary the angle of said raster relative to said film portion, the lengths of the lines of said raster being adjusted to maintain the aspect ratio of said image constant whereby said video signal represents an image angularly displaced relative to said film portion.

27. A telecine for generating a video signal representing an image on a transparent film portion, said telecine comprising scanning means for scanning said image with a scanning raster and control means operable to electronically vary the angle of the raster relative to said film portion, said control means being operable to vary said angle of said raster continuously whereby said video signal represents said image angularly displaced relative to said film portion and said video signal represents said image undergoing rotational motion relative to said film portion.

28. A telecine for generating a video signal representing an image on a transparent film portion, said telecine comprising scanning means for scanning said image with a scanning raster and control means operable to vary at the angle of said raster relative to said film portion whereby said video signal represents said image angularly displaced relative to said film portion, said control means being operable to cause successive lines of said raster to be offset relative to one another to compensate for movement of said portion through said telecine.

29. A telecine for generating a video signal representing an image on a transparent film portion, said telecine comprising scanning means for scanning said image with a scanning raster and control means operable to vary said angle of said raster relative to said film portion whereby said video signal represents said image angularly displaced relative to said film portion, said control means being operable to vary the lengths of said lines of said raster to compensate for movement of said film portion through said telecine.

30. A telecine for generating a video signal representing an image on a transparent film portion, said telecine comprising scanning means for scanning said image with a scanning raster and control means operable to vary the angle of said raster relative to said film portion whereby said video signal represents an image angularly displaced relative to said film portion, said control means being operable to vary the lengths of the lines of said raster to maintain the aspect ratio of said image constant.

31. A telecine for generating a video signal representing an image on a transparent film portion, said telecine comprising scanning means for scanning said image with a scanning raster and control means operable to vary the angle of said raster relative to said film portion whereby said video signal represents said image angularly displaced relative to said film portion, said scanning means including horizontal and vertical scan amplifiers and coils for generating said raster, both said vertical and horizontal scan amplifiers and coils being capable of scanning at a rate sufficient to provide the horizontal scan for generating video signals for use in conventional television systems.

* * * * *